Nov. 2, 1971 J. A. STROM 3,616,685
LOAD APPLYING DEVICE FOR A PRESSURE TEST CHAMBER
Filed June 29, 1970
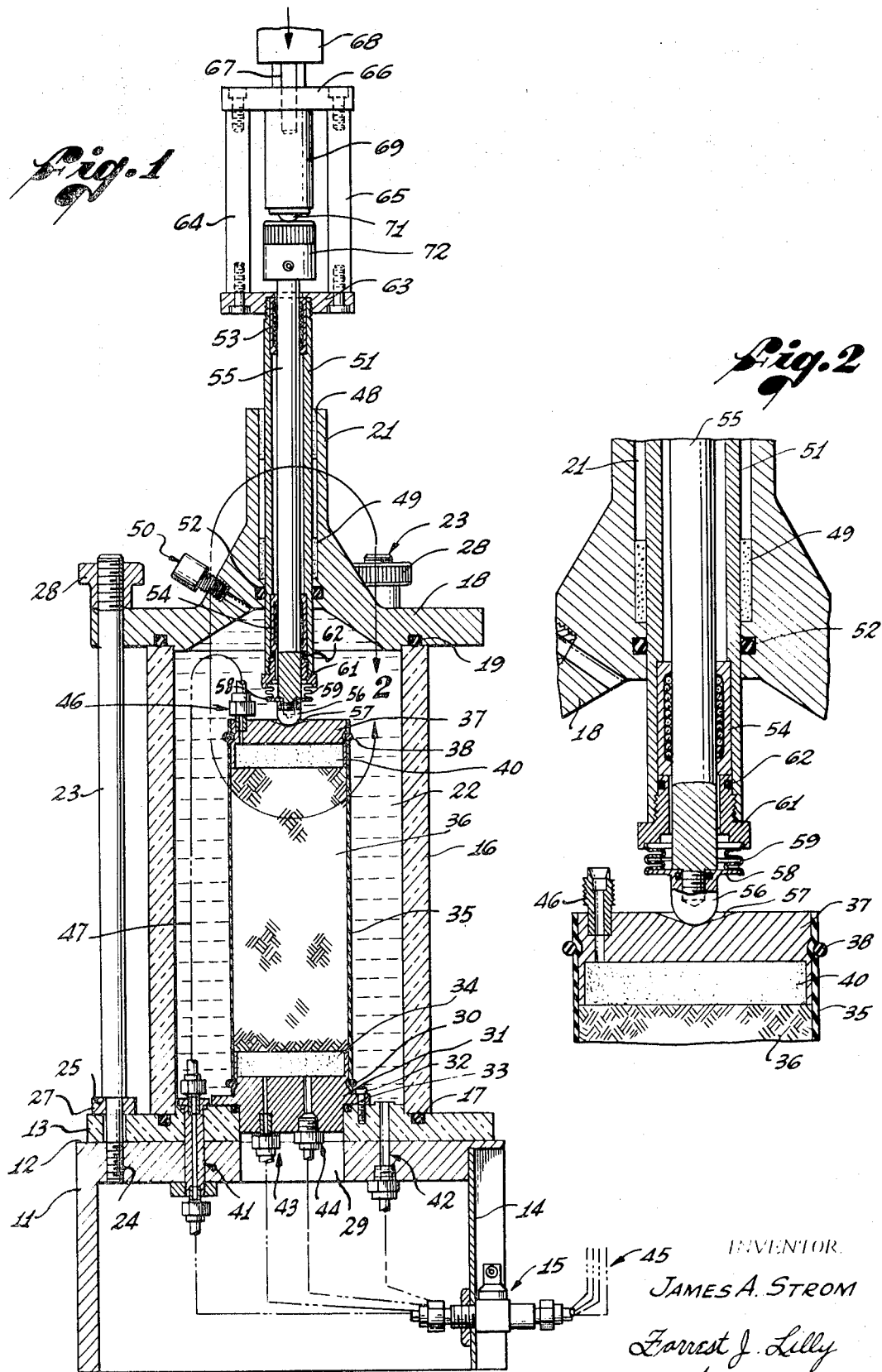
INVENTOR.
JAMES A. STROM
Forrest J. Lilly
ATTORNEYS 3,616,685
LOAD APPLYING DEVICE FOR A PRESSURE
TEST CHAMBER
James A. Strom, Whittier, Calif., assignor to
Dames and Moore, Los Angeles, Calif.
Filed June 29, 1970, Ser. No. 50,528
Int. Cl. G01n 3/02
U.S. Cl. 73—84                                         8 Claims

ABSTRACT OF THE DISCLOSURE

A device for applying a load to a sample within a pressure test chamber employing an outer hollow cylindrical load sleeve sealed by an O-ring in a chamber entrance. An inner load rod slides in the outer load sleeve in longitudinally recirculating ball bushings to move with a minimum of friction and is connected to the end of the load sleeve through a bellows assembly attached both to the end of the inner load rod and to the outer load sleeve. The inner load rod engages the sample within the pressure chamber and the load pressure is measured by that applied to the inner rod independently of any load which may be applied to the load sleeve. The effect of the chamber pressure on the inner load rod may be zeroed out of a read-out or recording device or may be readily computed from the value of the chamber pressure and deducted from the total load on the inner rod to give the actual load applied to the sample in the chamber.

BACKGROUND OF THE INVENTION

The pressure test chamber shown in the accompanying drawing and described hereinafter is a known unit into which a test load was introduced to a sample within the chamber through a load rod sealed in the chamber entrance by an O-ring through which the load applying rod moved. As the pressure within the test chamber was increased, friction caused by the O-ring seal on the load rod became a large percentage of the total load applied and measured external to the chamber so that the actual load applied to the sample was in error whereby compressive loads could be overstated and the sample show a higher strength than it actually possessed. To substantially remove the friction of the O-ring seal and the error introduced thereby, the load applying device of the present invention employs an outer load sleeve sealed to the chamber opening by an O-ring and an inner load rod sealed to the sleeve by a bellows assembly. The load is applied to the sample through the inner rod, which moves with a minimum of friction, and this load is measured and need be reduced only by the effect of the chamber pressure on the end of the load rod to determine the actual load applied to the sample.

SUMMARY OF THE INVENTION

This invention reduces the error caused by friction in the measurement of a load applied to a sample within a pressure test chamber where the load is applied and measured external to the chamber. The device employs an outer load sleeve in the form of a hollow cylinder guided for movement in bushings in the opening to the chamber and sealed therein by an O-ring. Within the load sleeve a concentric inner load rod is disposed for movement in bushings relative thereto. The end of the load rod is sealed to the end of the load sleeve by a stainless steel bellows assembly attached thereto. The inner load rod preferably is guided within longitudinally recirculating ball bushings within the load sleeve so that it moves relative thereto with a minimum of friction. The inner load rod engages the sample within the pressure chamber and only the load applied to the inner load rod is measured, this being independent of any load which may be required to move the outer load sleeve against the friction of its O-ring seal. From this measured load is deducted the effect of the pressure in the chamber against the end of the load rod to give the actual loading applied to the sample within the pressure chamber.

In using the load applying device of the invention the testing machine may apply a constant deflection to the sample by moving the load applying device at a constant rate or static loads may be applied to the sample through the load applying device in increments maintained until an equilibrium condition is achieved.

BRIEF DESCRIPTION OF THE DRAWINGS

FIG. 1 is a vertical sectional view, with parts shown in elevation, of a pressure test chamber with the load applying device of the present invention, FIG. 2 is an enlarged detailed sectional view of the portion of FIG. 1 within the oval arrows,

DESCRIPTION OF THE PREFERRED EMBODIMENT

The pressure test chamber and load applying device of the present invention, as illustrated in the drawings, comprises an inverted box-like metallic base 11 having a flat horizontal upper surface 12 against which is mounted a plastic plate 13 of an acrylic resin such as Plexiglas or like material. One wall of the base 11 includes a removable panel 14 in which are mounted four valve fittings 15. Above the plate 13 is mounted a plastic cylinder 16 also of Plexiglas or like material and sealed to the plate 13 by an O-ring 17. Above the plastic cylinder 16 is a metal cover plate 18 sealed to the top edge of the cylinder 16 by an O-ring 19 and having an integral central tube 21 extending upwardly therefrom and providing an opening therethrough leading into the chamber 22 provided within the plastic cylinder 16 between the base plate 13 and the cover plate 18. Tension rods 23 hold the parts together, with their lower ends screwed into the base 11 at 24 and having shoulders 25 engaging washers 27 bearing on the upper surface of the plate 13. The upper end of the tension rods 23 pass through clearance openings in the cover plate 18 which is pressed downwardly by finger nuts 28.

The top of the base 11 and the plate 13 have central aligned openings 29 therethrough, the upper portion of which in the plate 13 receives a sample base 31 connected to the plate by studs 32 and sealed to the plate by an O-ring 33. The upper surface of the sample base 31 is recessed to receive a porous stone plate 34. About the base 31 is mounted the lower end of a flexible rubber cylinder 35 sealed thereto by an O-ring 30 and within which is placed a soil sample 36 to be tested. The upper end of the rubber cylinder 35 receives a pressure plate 37 and sealed thereto by an outer O-ring 38.

Mounted on and extending through the top of the base 11 and the plate 13 to provide openings therethrough are a pair of fittings 41 and 42, each connected individually to one of the valves 15 on the panel 14. Extending through the base 31 are a pair of openings having connected thereto a pair of fittings 43 and 44, each also connected individually to one of the valves 15 on the panel 4. The outer ends of the valves 15 are connected through suitable tubing 45 to exterior hydraulic elements. The top sample pressure plate 37 has an opening therethrough in which there is a fitting 46 connected by tubing 47 to the fitting 41. A vent opening is provided through the top cover plate 18 which is adapted to be opened and closed by a finger valve fitting 50. The understurface of the pressure plate 37 is recessed to receive a porous stone plate 40.

Within the entrance tube 21 are a pair of spaced oil-impregnated bronze bushings 48 and 49 in which is slidably received an outer load sleeve 51 extending above the entrance tube 21 into the pressure chamber 22. The sleeve 51 is sealed in the entrance tube 21 by an O-ring 52. Within the sleeve 51 are a pair of longitudinally recirculating ball bushings 53 and 54 within which is guided an inner load rod 55. A rounded head 56 is tightly screwed on the lower end of the rod 55 and is received within a depression 57 in the top surface of the sample pressure plate 37.

The head 56 has an integral annular flange 58 to which is soldered the lower end of a stainless steel bellows 59 in sealing relation. The upper end of bellows 59 is sealingly soldered to a threaded plug 61 having a central hole therethrough through which the rod 57 passes. The plug 61 is screwed into the lower end of the sleeve 51 and sealed therein by an O-ring 62.

On the upper end of the load sleeve 51 is threadedly mounted a lower cross bar 63 having a pair of spaced uprights 64 and 65 mounted thereto and supporting an upper cross bar 66. On the upper cross bar 66 is mounted a load cap 67 engaged by a load applying part 68 of a testing machine. The load cap 67 may be in the form of a headed stud which mounts a load measuring cell 69 to the underside of the cross bar 66. This load measuring cell may be of a strain gauge or other type and has a rounded load applying element 71 at its bottom which engages the top of a rod load cap 72 on the upper end of the load rod 55.

The operation of the pressure test chamber and load applying device of the present invention is as follows:

An undisturbed or remodeled sample of soil, approximately 6 inches in length and 2½ inches in diameter by way of example, is placed within the flexible rubber cylinder 35 whose ends are closed by the bottom plate 31 and top pressure plate 37 to which the rubber cylinder is sealed by the O-ring 30 and 38, respectively. The bottom plate 31 is mounted to the plate 13 by studs 32 and the plastic cylinder 16 and cover plate 18 are assembled on the plate 13 by the tension rods 23. At this time the load sleeve 51 and load rod 55 are drawn sufficiently upwardly not to exert pressure on the soil sample 36. The test cell may then be placed in a testing machine with the base 11 on the machine platen and the cross head of the machine located to drive an element 68 thereon against the top pressure cap 67.

The valve 15 connected to the fitting 42 is opened to introduce water at a controlled pressure within the chamber 22, the air therein venting through the fixture 50 until water starts coming therethrough whereupon the fixture is tightened and the pressure in the chamber 22 built up to any desired value to simulate anticipated field conditions on the soil, the limit usually being about 100 p.s.i. using a Plexiglas cylinder 16.

The valve 15 connected to the fixture 43 may also be opened to introduce water into the interior of the rubber cylinder 35 to permeate the soil 36 so that it is completely saturated and water flows from the fixture 46 through the tube 47 to fixture 41 and out of the valve 15 connected thereto. The valves connected to fixtures 41 and 43 may now be closed.

The fixture 44 is connected through its valve 15 to a pressure transducer to measure the pressure within the rubber cylinder 35.

The cross head of the testing machine is now operated in either of two ways to apply a load to the top load cap 67. This can be done either by moving the cross head and platen of the testing machine toward each other at a constant rate as is well-known in such loading devices, or increments of load may be applied successively to the upper load cap 67 and maintained until equilibrium conditions are reached.

As the load is applied, the load sleeve 51 and the inner load rod 55 move downwardly to compress the sample 36, with the head 56 on the rod 55 moving the sample pressure plate 37 downwardly. The portion of the load which is required to move the sleeve 51 against the friction of its O-ring seal 52 is unmeasured, the load cell 69 measuring only that load which is applied by its element 71 to the rod load cap 72 and therefrom through the rod 55 to its head 56 and the sample pressure plate 37. The load measured at the cell 69 is then reduced by the effect of the pressure in the chamber 22 on the head 56 and annular ring 58 to give the actual pressure applied to the test sample. It will be seen that this load applying movement of the inner rod 55 occurs in the substantially frictionless bearings 53 and against the negligible resistance to movement of the bellows 59 and is not affected by the resistance to movement of the pressure sleeve 51 exterted by the friction of the O-ring seal 52.

In the above testing operation several measurements can be made. For example: the pressure within the chamber 22, the pressure from fitting 44 within the test sample of the rubber cylinder 35, and the load measured by the load cell 69. If water drainage from the sample is permitted through fitting 41 and its valve, this flow can be measured. From these values stress-strain plots for the samples may be made and evaluted to determine the shearing strength of the soils.

While a certain preferred embodiment of the invention has been specifically illustrated and described it is to be understood that the invention is not limited thereto as many variations will be apparent to those skilled in the art and the invention is to be given its broadest interpretation within the terms of the following claims:

I claim:

1. A local applying device for a pressure test chamber having a tubular entrance thereinto comprising:
    a cylindrical load sleeve journaled in said tubular opening for sliding movement into and out of said pressure chamber;
    means sealing said load sleeve in said tubular opening;
    a load rod extending concentrically through said load sleeve;
    flexible sealing means joining the lower end of said load rod to the lower end of said load sleeve to provide for limited relative axial movement therebetween;
    means for applying a load to the upper ends of said load rod and said load sleeve, said load rod only engaging a sample to be tested in said pressure chamber; and
    means for measuring only the portion of said load applied to said load rod independently of the portion thereof which is applied to the load sleeve.

2. The device defined in claim 1 in which the means interconnecting the lower ends of said rod and sleeve is a relatively highly flexible bellows.

3. The device defined in claim 1 in which said load rod is guided for movement in said load sleeve in longitudinally recirculating ball bushings to minimize frictional resistance to relative movement therebetween.

4. The device defined in claim 1 including:
    a rectangular frame mounted on the upper end of said load sleeve, the upper end of said load rod passing freely through the lower portion of said rectangular frame and said load being applied to the upper portion of said rectangular frame;
a load cap on the upper end of said rod within said frame; and
a load measuring cell between the upper portion of said frame and said load cap for measuring only the portion of the load applied to said load rod.

5. The device defined in claim 1 in which said load sleeve is guided in said tubular opening in a bushing disposed therebetween and in which said sealing means therebetween comprises an O-ring about said load sleeve.

6. The device defined in claim 1 in which the lower end of said load rod has a load applying head threadedly mounted thereto, said head having an integral annular ring thereabout and said flexible means having one part thereof rigidly and sealably connected to said annular ring.

7. The device claimed in claim 6 including:
means threadedly mounted on the lower end of said load sleeve in sealing relation, a portion of said flexible means being rigidly and sealably connected to said threaded means; and
a central opening through said threaded means through which said load rod freely passes.

8. The device defined in claim 7 in which said flexible means is a metallic bellows having substantially highly flexible convolutions and its opposite ends rigidly and sealably connected to the head annular ring and to the threaded means.

References Cited

UNITED STATES PATENTS

| | | | |
|---|---|---|---|
| 3,505,860 | 4/1970 | Bishop et al. | 73—94 |
| 3,457,777 | 7/1969 | Nielsen | 73—84 |
| 3,448,608 | 6/1969 | Bishop et al. | 73—94 |
| 3,216,242 | 11/1965 | Eyrich | 73—94 |
| 2,810,289 | 10/1957 | Button | 73—94 |

OTHER REFERENCES

"Constant Rate of Strain Consolidation Test," by A. Wissa, p. 53 (Fig. 1), dated May 25, 1970.

RICHARD C. QUEISSER, Primary Examiner

M. SMOLLAR, Assistant Examiner

U.S. Cl. X.R.

73—94; 74—18.2; 308—3.5